United States Patent
Magini et al.

(10) Patent No.: US 9,203,337 B2
(45) Date of Patent: Dec. 1, 2015

(54) METHOD FOR CONTROLLING A MULTIPHASE MACHINE

(75) Inventors: Fabio Magini, Hemmingen (DE); Paul Mehringer, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 150 days.

(21) Appl. No.: 14/131,660

(22) PCT Filed: Jun. 20, 2012

(86) PCT No.: PCT/EP2012/061795
§ 371 (c)(1),
(2), (4) Date: Apr. 9, 2014

(87) PCT Pub. No.: WO2013/007486
PCT Pub. Date: Jan. 17, 2013

(65) Prior Publication Data
US 2014/0217948 A1    Aug. 7, 2014

(30) Foreign Application Priority Data
Jul. 8, 2011    (DE) .......................... 10 2011 078 841

(51) Int. Cl.
*H02P 1/30* (2006.01)
*H02P 1/52* (2006.01)
*H02P 3/00* (2006.01)
(Continued)

(52) U.S. Cl.
CPC ............. *H02P 23/0095* (2013.01); *H02M 1/15* (2013.01); *H02M 7/53875* (2013.01)

(58) Field of Classification Search
CPC ............................... H02P 23/0095; H02P 6/10
USPC ....................... 318/503, 400.2, 139
See application file for complete search history.

(56) References Cited

U.S. PATENT DOCUMENTS 6,392,905 B1    5/2002   Huang et al.
6,630,764 B1 *  10/2003  Dube et al. .................... 310/177
(Continued)

FOREIGN PATENT DOCUMENTS

DE      19947476        4/2001
WO      WO2005/034333   4/2001
WO      WO2009/106673   9/2009

OTHER PUBLICATIONS

International Search Report for PCT/EP2012/061795, issued on May 17, 2013.
(Continued)

*Primary Examiner* — Erick Glass
(74) *Attorney, Agent, or Firm* — Kenyon & Kenyon LLP

(57) ABSTRACT

A method for controlling a multiphase machine which is connected to a direct current voltage source. The machine has a DC link which is provided with a DC link capacitor, phase windings, and a high side switch and a low side switch for each phase. The switches associated with the individual phases are acted on by control signals from a control unit. For reducing the DC link current, the control unit provides block-shaped control signals for the switches associated with the individual phases in such a way that trapezoidal or pulsed phase currents are predefined, at least one phase current is connected at any point in time in each control cycle, and the value of the amplitude ratio of the predefined phase currents is selected in such a way that the connected phase currents correspond to the instantaneous current of the direct current voltage source.

11 Claims, 14 Drawing Sheets

(51) Int. Cl.
*H02P 23/00* (2006.01)
*H02M 1/15* (2006.01)
*H02M 7/5387* (2007.01)

(56) References Cited

U.S. PATENT DOCUMENTS

2007/0001633 A1* 1/2007 Su et al. ................ 318/254
2009/0251096 A1* 10/2009 Schulz et al. ............ 318/801
2010/0072928 A1* 3/2010 Welchko ............... 318/400.13
2014/0176027 A1* 6/2014 Osaki et al. ........... 318/400.2

OTHER PUBLICATIONS

Hobraiche, et al., "A New PWM Strategy to Reduce the Inverter Input Current Ripples," IEEE Transactions on Power Electronics, vol. 24, No. 1, 2009, pp. 172-180.

* cited by examiner

FIG. 4
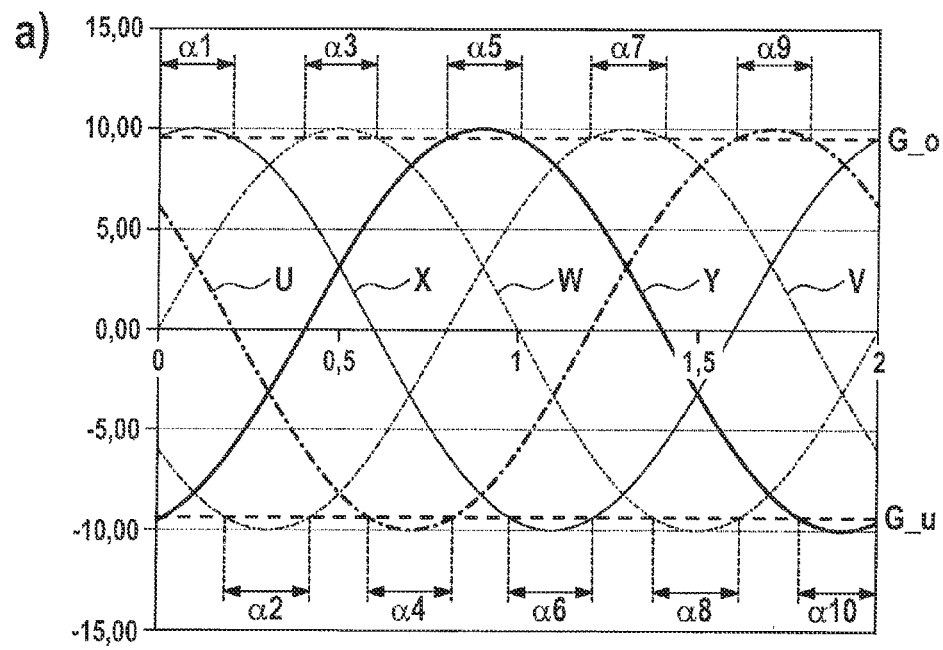
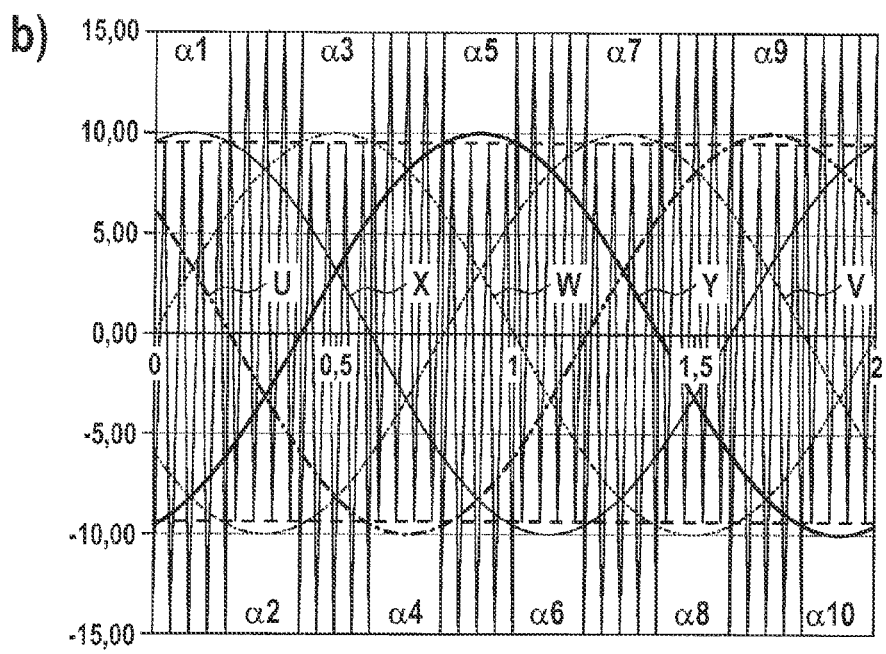

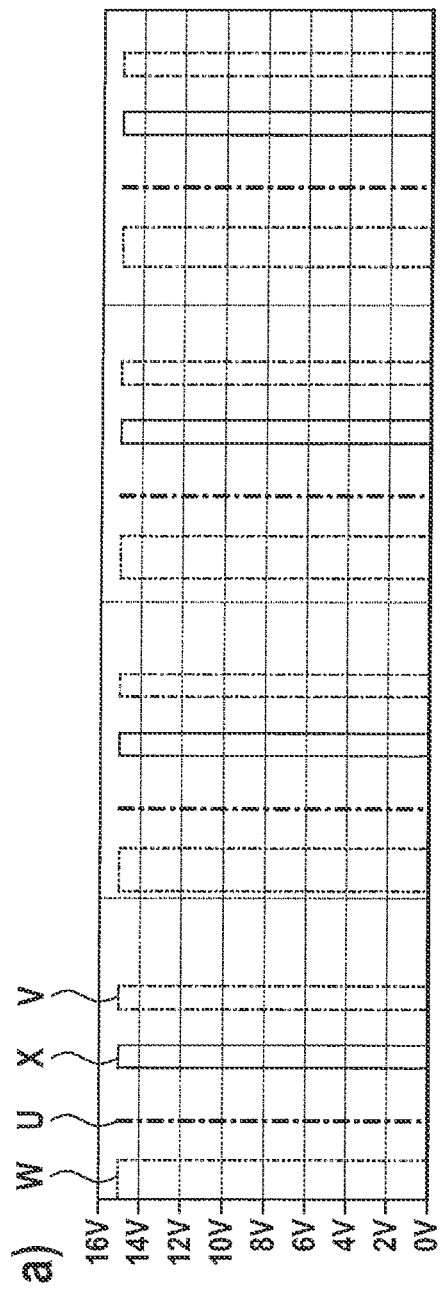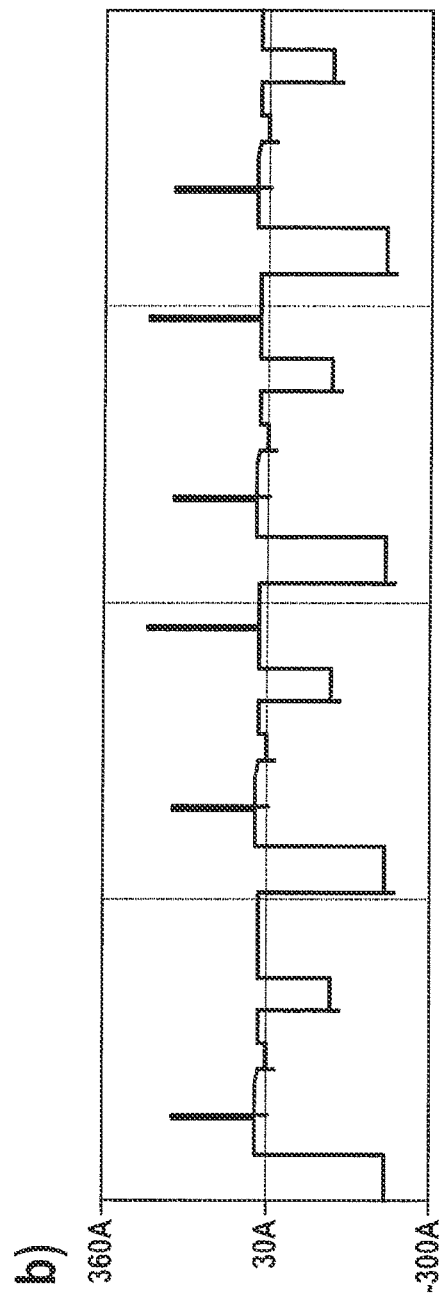
FIG. 5

FIG. 6
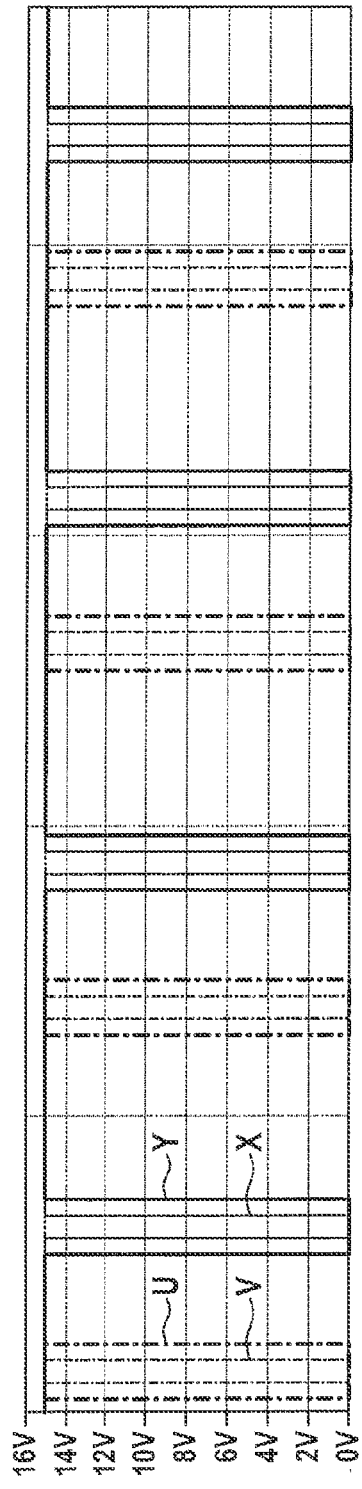
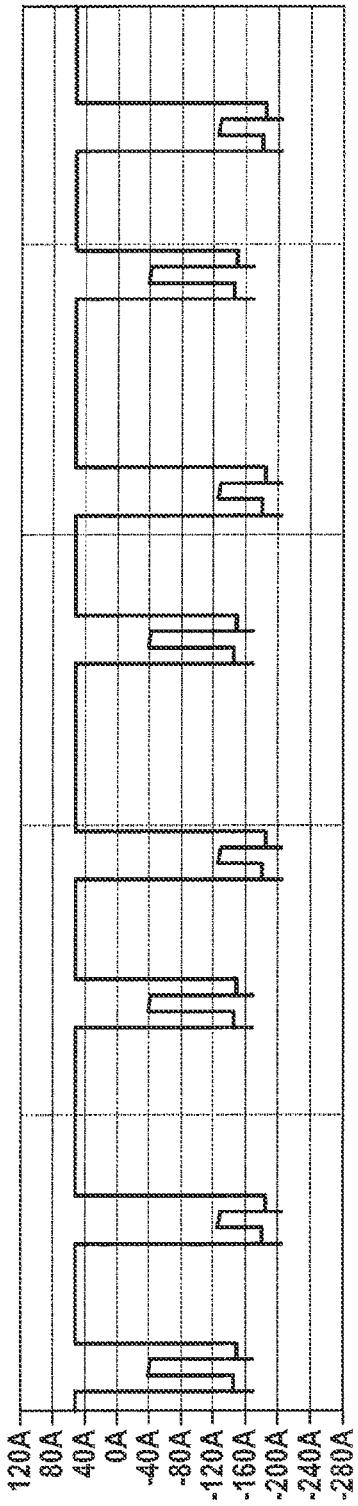

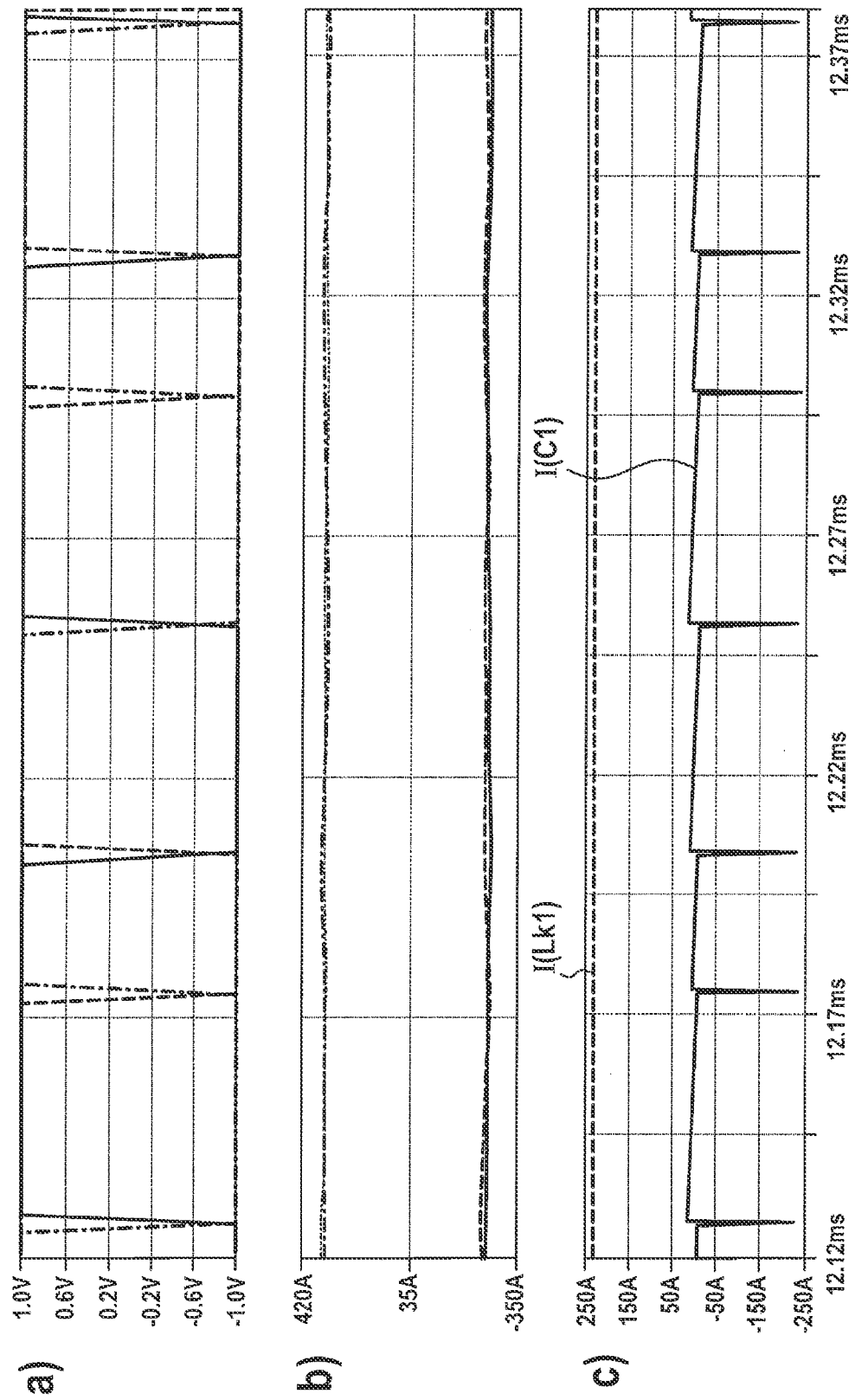

METHOD FOR CONTROLLING A MULTIPHASE MACHINE

FIELD OF THE INVENTION

The present invention relates to a method for controlling a multiphase machine.

BACKGROUND INFORMATION

Multiphase electric drives are known in which various modulation types are used. Use of pulse width modulation (PWM) in multiphase drives is very common. Multiphase drives of this type are controlled as a function of the particular requirements that are present, according to one of the following methods:
- use of sinusoidal current control (sinusoidal commutation),
- use of block current control (block energization),
- use of block voltages (control with block voltages),
- use of sinusoidal voltage control with superimposed zero voltages.

In principle, the above-mentioned techniques may be used in electric machines having any arbitrary phase number. Electric machines having three phases are most common in practice. However, there are also electric machines having a different phase number, for example two, four, five, six, seven, or nine phases.

In addition, so-called start-stop systems are already known. These systems are used for stopping and restarting an internal combustion engine for the purpose of reducing the fuel consumption and the exhaust gas emissions.

A start-stop system developed by the present applicant operates on the basis of conventional starters. The particular starter is controlled by an electronic control unit, and with the aid of a pinion meshes with a ring gear provided on the flywheel.

Furthermore, it has previously been proposed to implement a belt-driven starter generator on the basis of a claw pole generator, using an additional electronic control unit. In starter generators of this type, the phases are often directly connected to a direct current voltage source such as a battery via electronic semiconductor switches without using a clock method such as PWM.

To be able to recuperate higher amounts of energy in the case of braking, systems having fairly high voltages are necessary. At higher voltages, clocking of the supply voltage in the converter is necessary for starting the internal combustion engine in order to limit the current in the machine to a predefined maximum value. A clocked converter requires a DC link to high-capacitance capacitors in order to smooth the alternating components in the intake current. In the output stages, the dimensioning of the DC links often determines the space requirements for the particular output stage.

As discussed above, in the mentioned machines, types of operations using the clock method (PWM) are used at higher voltages, and types of operations using block commutations (without PWM) are used at lower voltages or at higher rotational speeds. Measuring the current is particularly important in the clock methods, since current control is carried out in these clock methods, for which it is necessary to measure the actual currents.

For measuring the current in the individual phases of the electric machine, either shunt resistors, which convert the current into an equivalent voltage signal, or indirect current measuring methods, such as current transformers or LEM converters, are used.

SUMMARY

In contrast, a method has the advantage that the DC link currents which arise are greatly reduced compared to known control methods. This advantage is achieved by a method for controlling a multiphase machine which is connected to a direct current voltage source and which has a DC link that is provided with a DC link capacitor, and a high side switch and a low side switch for each phase, the switches associated with the individual phases being acted on by control signals from a control unit, and the switches associated with the individual phases being acted on by control signals from a control unit, and for reducing the DC link current, the control unit providing control signals for the switches associated with the individual phases in such a way that trapezoidal or pulsed phase currents are predefined, at least one phase current is connected at any point in time in each control cycle, and the value of the amplitude ratio of the predefined phase currents is selected in such a way that the phase currents connected at that moment correspond to the instantaneous current of the direct current voltage source.

BRIEF DESCRIPTION OF THE DRAWINGS

FIG. 4 shows diagrams for illustrating a five-phase sinusoidal system.

FIG. 5 shows diagrams for illustrating a first improved control pattern and the DC link current which arises.

FIG. 6 shows diagrams for illustrating a second improved control pattern and the DC link current which arises.

FIG. 17 shows diagrams for illustrating current curves when the control pattern shown in FIG. 11 is used.

DETAILED DESCRIPTION

The present invention relates to a method for controlling a multiphase machine which is connected to a direct current voltage source such as a battery, the multiphase machine having a DC link which is provided with a DC link capacitor, and a high side switch and a low side switch for each phase, the switches associated with the individual phases being acted on by control signals from a control unit. This method is not limited to a specific phase number of the machine, but is explained in greater detail below with reference to a five-phase machine.

Figure 1:
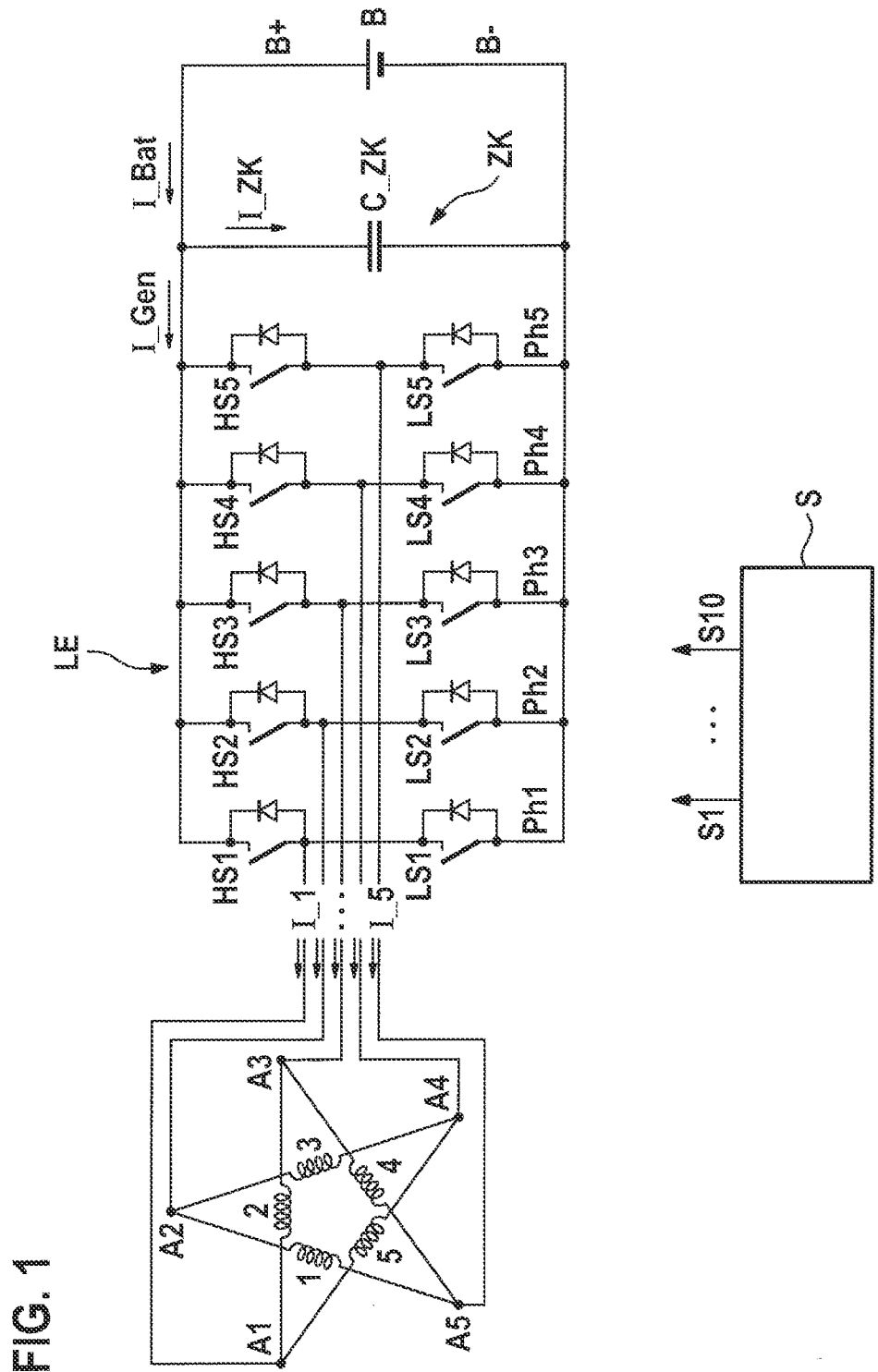
FIG. 1 shows a diagram for explaining a five-phase machine connected to a direct current voltage source, such as a battery, in a pentagram circuit having a B10 bridge.

FIG. 1 shows a diagram for explaining a five-phase machine in a pentagram circuit having a B10 bridge. A pentagram circuit is understood to mean a type of circuit in which the total of five phase windings of the circuit are electrically connected to one another in such a way that the shape of the circuit diagram is a pentagram.

The machine shown has a total of five phase terminals A1, A2, A3, A4, A5 and a total of five phase windings 1, 2, 3, 4, 5, each of these phase windings being connected between two of the mentioned phase terminals. In addition, the machine shown has a power electronics system LE which is connected to the phase terminals, and a direct current voltage source such as a battery B. Direct current voltage source B has a positive pole B+ and a negative pole B−. A DC link ZK which contains a DC link capacitor C_ZK is situated between battery B and power electronics system LE.

Power electronics system LE contains five branches Ph1, Ph2, Ph3, Ph4, and Ph5, each of which has two switches connected in series, a diode being connected antiparallel to each of these switches. This configuration results when conventional field effect transistors are used as switches, since they contain an inverse diode. However, the use of other circuit elements, for example IGBTs, is also possible in principle.

Branch Ph1 of power electronics system LE, which contains switches HS1 and LS1, is connected to phase terminal A1 of the stator of the machine at a connecting point between the two switches HS1 and LS1. Switch HS1 of branch Ph1 is a high side switch. A diode is connected antiparallel to switch HS1. Switch LS1 of branch Ph1 is a low side switch. A diode is connected antiparallel to switch LS1. Switches HS1 and LS1 are controlled by control unit S via control signals S1 and S2.

Branch Ph2 of power electronics system LE, which contains switches HS2 and LS2, is connected to phase terminal A2 of the stator of the machine at a connecting point between the two switches HS2 and LS2. Switch HS2 of branch Ph2 is a high side switch. A diode is connected antiparallel to switch HS2. Switch LS2 of branch Ph2 is a low side switch. A diode is connected antiparallel to switch LS2. Switches HS2 and LS2 are controlled by control unit S via control signals S3 and S4.

Branch Ph3 of power electronics system LE, which contains switches HS3 and LS3, is connected to phase terminal A3 of the stator of the machine at a connecting point between the two switches HS3 and LS3. Switch HS3 of branch Ph3 is a high side switch. A diode is connected antiparallel to switch HS3. Switch LS3 of branch Ph3 is a low side switch. A diode is connected antiparallel to switch LS3. Switches HS3 and LS3 are controlled by control unit S via control signals S5 and S6.

Branch Ph4 of power electronics system LE, which contains switches HS4 and LS4, is connected to phase terminal A4 of the stator of the machine at a connecting point between switches HS4 and LS4. Switch HS4 of branch Ph4 is a high side switch. A diode is connected antiparallel to switch HS4. Switch LS4 of branch Ph4 is a low side switch. A diode is connected antiparallel to switch LS4. Switches HS4 and LS4 are controlled by control unit S via control signals S7 and S8.

Branch Ph5 of power electronics system LE, which contains switches HS5 and LS5, is connected to phase terminal A5 of the stator of the machine at a connecting point between the two switches HS5 and LS5. Switch HS5 of branch Ph5 is a high side switch. A diode is connected antiparallel to switch HS5. Switch LS5 of branch Ph5 is a low side switch. A diode is connected antiparallel to switch LS5. Switches HS5 and LS5 are controlled by control unit S via control signals S9 and S10.

During operation of the machine shown in FIG. 1, the following relationship applies for any arbitrary point in time:

$$I\_ZK = I\_Bat - I\_Gen.$$

This results in generator current I_Gen as a function of the position of the switches of the power electronics system based on a superimposition of phase currents I_1 through I_5 for the phases whose high side switch is switched on at the particular point in time.

A so-called center-aligned control is already known, in which the time period for the current flow is concentrated in a small time range. A control pattern for this type of center-aligned control and the currents which arise are illustrated in the diagrams shown in FIG. 2, the control pulses for the switches associated with the phases being denoted by reference characters U, V, W, X, and Y, and the phase currents being denoted by reference characters I_U, I_V, I_W, I_X, and I_Y in FIG. 2.

FIG. 2a illustrates the actuating signals for the switches, FIG. 2b illustrates DC link current I_ZK, FIG. 2c illustrates voltage V_B+ present at the positive pole of the direct current voltage source, FIG. 2d illustrates current of direct current voltage source I_Bat, and FIG. 2e illustrates phase currents I_X through I_Y.

It is apparent in particular from FIG. 2a that during center-aligned control, the pulse centers of the control pulses match with respect to time, as indicated by a vertical dashed-dotted line in FIG. 2a. It is also apparent from FIG. 2a that the edges of the control pulses differ from one another with respect to time, and are present in a limited time range. The text "free-wheeling LS" indicates that all low side switches are switched on during this time interval. The text "free-wheeling HS" indicates that all high side switches are switched on during this time interval. The text "drive" indicates that during this narrow time window the electric machine is connected to the external voltage via the switch positions. This causes a change in current in the stator windings. If a control pulse is present at the voltage level of 16 V, the particular associated high side switch is switched on. If a control pulse is present at a voltage level of 0 V, the particular associated low side switch is switched on.

It is apparent from FIG. 2b that DC link current I_ZK is subjected to intense changes in the time range of the edges of the control pulses, as also illustrated in greater detail with reference to FIG. 3.

It is apparent from FIG. 2c that battery voltage V_B+ is also subjected to intense changes in the time range of the edges of the control pulses.

FIG. 2d shows current I_Bat of the direct current voltage source, and FIG. 2e shows phase currents I_X through I_Y, which do or do not make a contribution to the DC link current, depending on the position of the particular associated high side switch.

Figure 2:
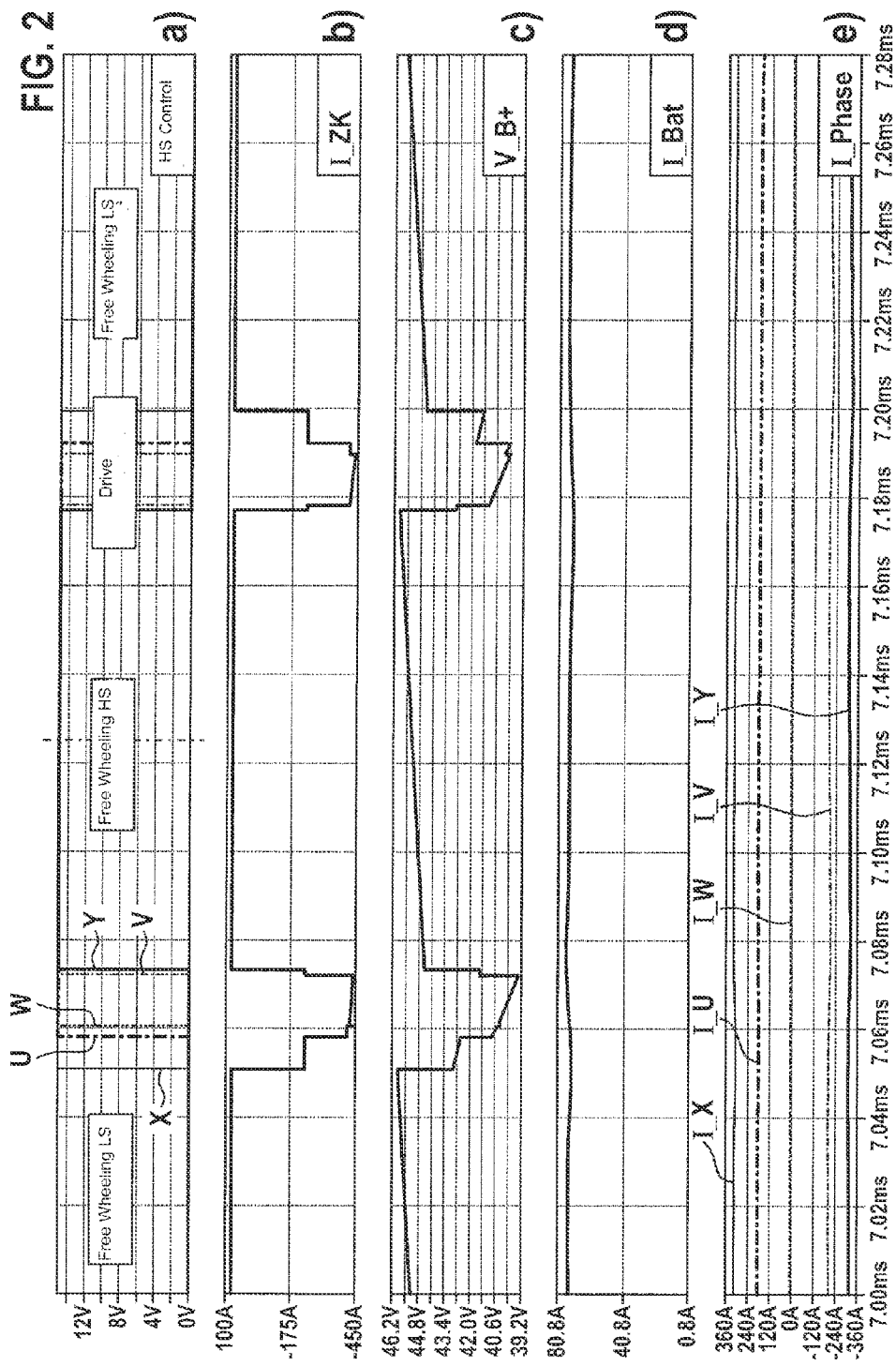
FIG. 2 shows diagrams for illustrating a known center-aligned control pattern and currents which arise.
Figure 3:
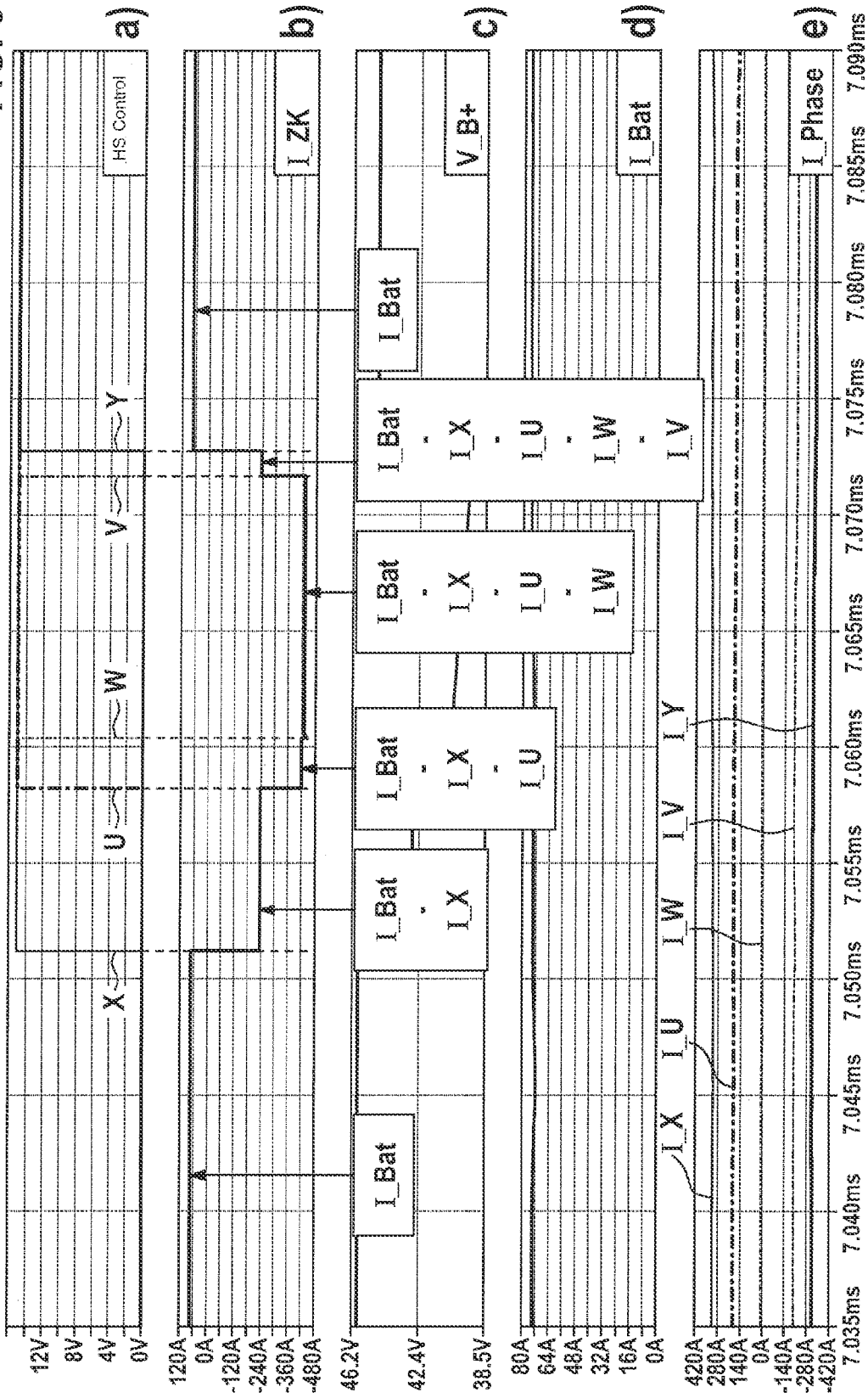
FIG. 3 shows an enlarged detail from the diagrams shown in FIG. 2.

FIG. 3 shows an enlarged detail of the diagrams shown in FIG. 2. FIG. 3a once again illustrates the actuating signals for the switches, FIG. 3b illustrates DC link current I_ZK, FIG. 3c illustrates voltage V_B+ present at the positive pole of the direct current voltage source, FIG. 3d illustrates current I_Bat of the direct current voltage source, and FIG. 3e illustrates phase currents I_X through I_Y.

It is apparent from FIG. 3b that DC link current I_ZK is formed by a superimposition of current I_Bat of the direct current voltage source on the particular active phase current(s), and that in the case that the high side switches associated with phase terminals X, U, and W are switched on, a high DC link current flows, which in the present example is approximately 420 A, while the current of the direct current voltage source is approximately 80 A and the effective phase current is approximately 200 A.

It emerges from FIGS. 2 and 3 that current steps, which correlate with the individual switching events with respect to time, occur in the DC link when the known center-aligned control is used. During the free-wheeling times indicated in FIG. 2, i.e., when all high side switches and low side switches are closed, I_Gen=0. Consequently, the following applies for the DC link current: I_ZK=I_Bat. In this phase the DC link capacitor is recharged. The currents are summed in the control phase.

The effective current is crucial for the consideration of power loss for the DC link capacitor. The following relationship applies:

$$X = \left( \frac{1}{T} \cdot \int_0^T x(t)^2 \cdot dt \right)^{\frac{1}{2}}.$$

The arithmetic mean of the capacitor current is zero when inherent losses are ignored. The effective value increases sharply when the currents are totally added, i.e., when the current flow "tapers." The thermal stress on the DC link capacitor is high due to this sharp rise in the effective value. Such high thermal stress, which occurs when center-aligned control is used, is avoided in a method according to the present invention.

In DE 10 2011 076 676.6 by the present applicant, it has previously been proposed to expand the width of the current distribution via a new control pattern, thus reducing the effective value of the DC link current and the thermal stress on the DC link capacitor.

FIG. 4a shows a diagram for illustrating a five-phase sinusoidal system as used in DE 10 2011 076 676.6, in this diagram the phase sequence being different from that in the diagrams shown in FIGS. 2 and 3. The angle in units of π is plotted along the abscissa, and the setpoint voltage inputs are plotted along the ordinate. The associated phase currents are denoted by reference characters U, V, W, X, and Y. An upper limiting value is denoted by reference character G_o, and a lower limiting value is denoted by reference character G_u. These limiting values are illustrated in dashed-dotted lines in FIG. 4a. Upper limiting value G_o is slightly less than the maximum positive setpoint voltage value. The other limiting value G_u is slightly greater than the minimum negative setpoint voltage value.

The mentioned limiting values are ascertained as follows:

G_o=U_setpoint_amplitude*cos(360°/(4*PZ))

G_u=−G_o, where PZ is the phase number of the machine.

According to DE 10 2011 076 676.6, the control unit provides pulsed control signals for the switches in successive control cycles, the pulse widths and pulse starts of the control signals being varied in each case within a control cycle in such a way that the DC link current is reduced.

This takes place according to the flat top process, for example. In this process, certain switches are switched on in succession, as explained below.

FIG. 4a shows angular intervals or flat top windows α1, . . . , α10 in which voltage inputs exist in the sense that either the setpoint voltage value associated with a current phase is greater than upper limiting value G_o or is less than lower limiting value G_u. If the setpoint voltage value associated with a current phase is greater than upper limiting value G_o, the associated high side switch is switched on in the associated angular interval. However, if the setpoint voltage value associated with a current phase is less than lower limiting value G_u, the associated low side switch is switched on in the associated angular interval, as explained below with reference to FIG. 4b.

This figure illustrates generation of control patterns for sinusoidally commutated electric machines, using a sine-triangle comparison. By applying an offset factor, which in each case is switched over at the point in time of a flat top window switchover, to the triangle function, this automatically results in switching-on of the ten participating switches in rotation. The sinusoidal signals correspond to the setpoint voltage inputs.

It is apparent from FIGS. 4a and 4b that in angular interval α1 the high side switch of phase X is switched on, in angular interval α2 the low side switch of phase V is switched on, in angular interval α3 the high side switch of phase W is switched on, in angular interval α4 the low side switch of phase U is switched on, in angular interval α5 the high side switch of phase Y is switched on, in angular interval α6 the low side switch of phase X is switched on, in angular interval α7 the high side switch of phase V is switched on, in angular interval α8 the low side switch of phase W is switched on, in angular interval α9 the high side switch of phase U is switched on, and in angular interval α10 the low side switch of phase Y is switched on.

During a phase shift of current and voltage, it may be meaningful to shift angular intervals α1 through α10 to the right or the left, in the present case a maximum shift of 18°, in general 360°/(4*phase number), being possible.

In each of these angular intervals, apart from the phase current which is associated with the particular switch that is switched on, all other phase currents are used for reducing the DC link current. This takes place in that the control unit, using a suitable control pattern, shifts the mentioned further phase currents relative to one another in such a way that the resulting DC link current is reduced. This may be achieved by shifting the mentioned further phase currents in such a way that overlaps of positive phase currents are reduced, and/or by shifting the mentioned further phase currents in such a way that positive and negative phase currents at least partially compensate for one another.

FIG. 5 shows diagrams for illustrating a control pattern according to the present invention described in DE 10 2011 076 676.6 and the DC link current which arises. FIG. 5a shows the control pattern, and FIG. 5b shows the DC link current which arises. It is apparent from FIG. 5a that the control pulses associated with the phases for the particular associated switches are separate from one another with respect to time, i.e., are not superimposed on one another. It is apparent from FIG. 5b that with each switching operation according to FIG. 5a, a corresponding compensating current flows in the DC link. The absolute values of the DC link current are approximately 30% lower, and therefore greatly reduced, compared to the DC link current shown in FIG. 2b. This reduction is due to the fact that intense exaggeration of the DC link current due to systematic superimposition of the phase currents no longer occurs.

In a further optimization step, the current peaks of the DC link current shown in FIG. 5b extending in the positive direction may also be eliminated. For purposes of this further reduction in the DC link current, an attempt is made to bring about a state in which the DC link current is always in the range close to its zero line. Current components, which cause an addition to the battery current, are particularly objectionable in this regard.

This undesired superimposition of phase currents is avoided by suitably shifting the associated control pulses within a control period. This shift may take place within a control period in any arbitrary manner without limiting the effect of sinusoidal commutation. As a result, the effective DC link current may once again be reduced when the control of the phases whose two switches are not switched on in the flat top window at that moment are shifted relative to one another in such a way that overlaps of positive or also negative phase currents are avoided, and/or that positive and negative phase currents are at least partially mutually compensated for.

FIG. 6 shows diagrams for illustrating a control pattern according to the above-described refinement, according to which superimposition of positive and negative phase currents takes place in such a way that the DC link current is reduced, and illustrating the DC link current which arises. FIG. 6a shows the control pattern, and FIG. 6b shows the DC link current which arises. In comparison to FIG. 5b, it is apparent that the positive peaks of the DC link current are no longer present. In comparison to FIG. 2b, it is apparent that the maximum amplitude of the DC link current is reduced and that the distribution of the DC link current is broadened.

FIGS. 5 and 6 have been selected to be different with regard to the angular positions shown in each case, and therefore are not directly comparable to one another. However, the desired effect of avoiding the positive peaks in the DC link current, as shown in FIG. 5b, is correctly illustrated in FIG. 6.

With the aid of the above-described control patterns, which are the subject matter of DE 10 2011 076 676.6, the DC link current may be reduced by up to 40% compared to conventional center-aligned control. Sinusoidal setpoint current inputs and setpoint voltage inputs are used in this case.

The aim of the present invention is to achieve a further reduction in the DC link current. For this purpose, a departure is made from the sinusoidal current shape. Instead, a phase current input takes place which has either a trapezoidal shape, or, ideally, is in the form of pulses.

To obtain a DC link current which in the ideal case is 0 A, the following requirements are stipulated:

At any point in time in a control cycle, at least one phase current is connected which completely consumes the applied current of the direct current voltage source.

As soon as one phase current is disconnected, another phase current is connected which takes on the current of the direct current voltage source.

Since the current of the direct current voltage source remains constant in a first approximation due to the feed line inductance, it is advantageous for the phase currents which arise to follow a constant value.

There should be no control gaps within a control cycle.

Figure 7:
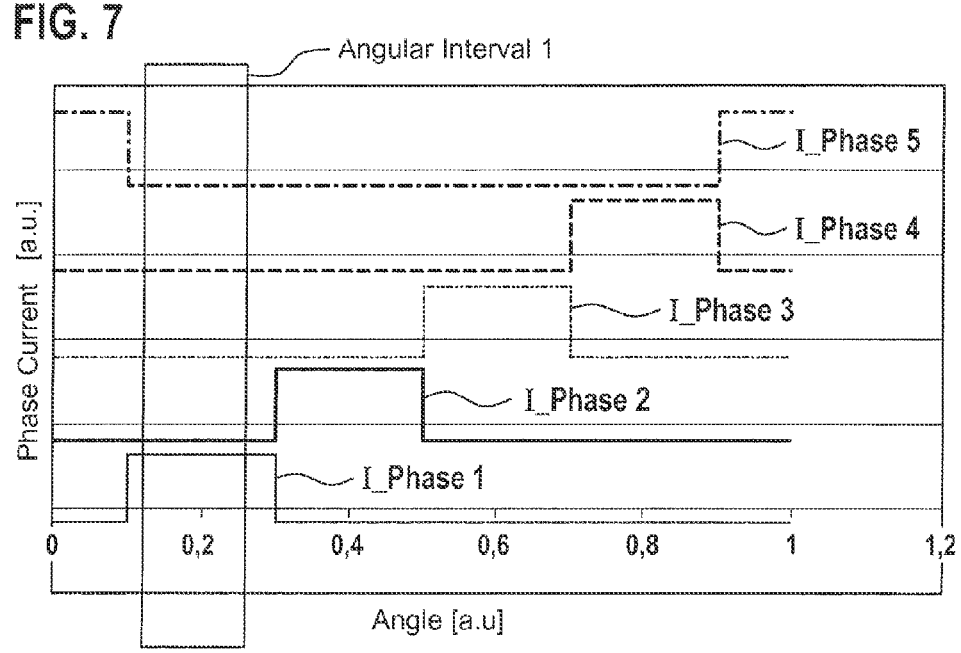
FIG. 7 shows diagrams for illustrating the phase current curve over an electrical period, expressed in 2*pi, of a first exemplary embodiment of the present invention (4:1).

A phase current input which meets these requirements is illustrated in FIG. 7, in which diagrams for illustrating a first exemplary embodiment of the present invention are shown. The angle in arbitrary units (a. u.) is plotted along the abscissa, and the phase current inputs for the phase currents, likewise in arbitrary units (a. u.), are plotted along the ordinate. The current pattern according to FIG. 7 is characterized in that at any point in time within a control cycle, one of the phases has a positive current value, while the other four phases each have the same negative current value. The amplitude of the negative current value corresponds to one-fourth of the amplitude of the positive current value, so that at any point in time in a control cycle, the sum of the phase currents is 0. No gaps occur within a control cycle. At any point in time at which one positive phase current is disconnected, another positive phase current is connected. The value of the amplitude ratio of the particular connected phase currents is selected in such a way that the phase currents connected at that moment correspond to the instantaneous current of the direct current voltage source.

It is apparent from the rectangular box delineated in FIG. 7 that in this angular range the following applies:

$$I\_Phase1 = -(I\_Phase2 + I\_Phase3 + I\_Phase4 + I\_Phase5).$$

Figure 8:
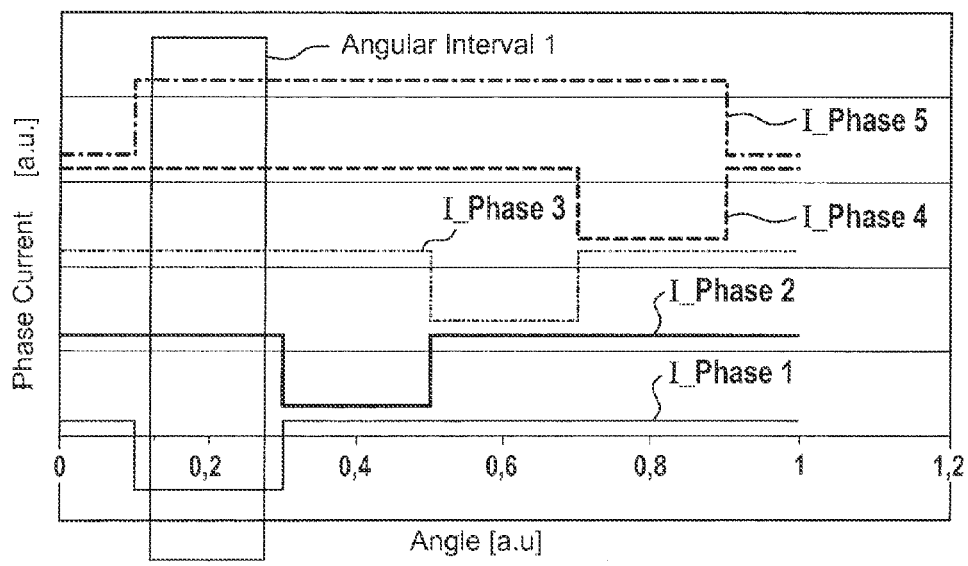
FIG. 8 shows diagrams for illustrating the phase current curve over an electrical period, expressed in 2*pi, of a second exemplary embodiment of the present invention, the phase currents being inverted with respect to FIG. 7 (4:1).

Another phase current input which meets the mentioned requirements is shown in FIG. 8. This figure shows diagrams for illustrating a second exemplary embodiment of the present invention. Also in FIG. 8, the angle in arbitrary units (a. u.) is plotted along the abscissa, and the phase current inputs for the phase currents, likewise in arbitrary units (a. u.), are plotted along the ordinate. The current pattern according to FIG. 8 is characterized in that at any point in time within a control cycle, one of the phases has a negative current value, while the other four phases each have the same positive current value. The amplitude of the positive current value corresponds to one-fourth of the amplitude of the negative current value, so that at any point in time in a control cycle, the sum of the phase currents is once again 0. Here as well, no gaps occur within a control cycle. At any point in time at which one negative phase current is disconnected, another negative phase current is connected. Here as well, the value of the amplitude ratio of the particular connected phase current is selected in such a way that the particular phase currents connected at that moment correspond to the instantaneous current of the direct current voltage source.

It is apparent from the rectangular box delineated in FIG. 8 that in this angular range the following applies:

$$I\_Phase1 = -(I\_Phase2 + I\_Phase3 + I\_Phase4 + I\_Phase5).$$

The current inputs are not indicated in the diagrams according to FIGS. 7 and 8, since, similarly as for a block commutation, a reduction of the DC link current to 0 is possible only at a certain phase current amplitude which occurs in the respective individual case as a function of the voltage level, the stator resistances, the type of circuitry of the motor, and the instantaneous mutual induction. When a corresponding pulse pattern occurs, due to the increasing mutual induction a drop in the battery current and phase current results with increasing rotational speed. Therefore, further phase current inputs having a higher resulting amplitude are necessary.

Figure 9:
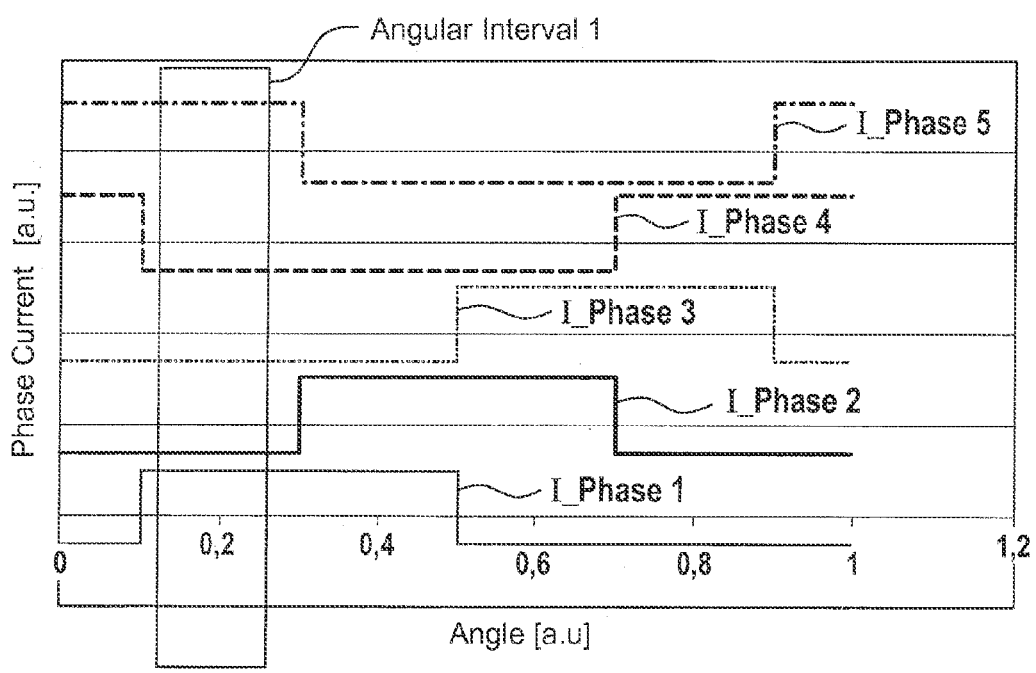
FIG. 9 shows diagrams for illustrating the phase current curve over an electrical period, expressed in 2*pi, of a third exemplary embodiment of the present invention (3:2).

FIG. 9 shows diagrams for illustrating a third exemplary embodiment of the present invention. Also in FIG. 9, the angle in arbitrary units (a. u.) is plotted along the abscissa, and the phase current inputs for the phase currents, likewise in arbitrary units (a. u.), are plotted along the ordinate. The current pattern according to FIG. 9 is characterized in that at any point in time within a control cycle, two phases have the same positive current value, while the other three phases each have the same negative current value. The amplitude of the positive current value corresponds to 1.5 times the amplitude of the negative current value. As a result, in this exemplary embodiment as well, at any point in time in a control cycle the sum of the phase currents has the value 0. In this exemplary embodiment as well, no gaps occur within a control cycle. Two positive phase currents and three negative phase currents are connected at any point in time in a control cycle. At any point in time at which one positive phase current is disconnected, another positive phase current is connected. The value of the amplitude ratio of the particular connected phase currents is selected in such a way that the phase currents connected at that moment correspond to the instantaneous current of the direct current voltage source.

It is apparent from the rectangular box delineated in FIG. 9 that in this angular range the following applies:

$$(I\_Phase1 + I\_Phase5) = -(I\_Phase2 + I\_Phase3 + I\_Phase4).$$

For reducing DC link currents which cancel each other out overall, the control pattern used follows a flat top process. For this purpose, for example for achieving a control pattern according to FIG. 7 in angular interval or time interval 1, which corresponds to the rectangle delineated there, the high side switch associated with phase 1 is continuously switched on, while the other phases for the most part are likewise switched on on the high side, and in alternation the particular low side switch is actuated in such a way that at any point in time, the same current is required from the direct current voltage source. Accordingly, in angular interval or time interval 1 in the exemplary embodiment shown in FIG. 9, which corresponds to the rectangle delineated there, the high side switches associated with phases 1 and 5 are switched on, while the low side switches associated with phases 2, 3, and 4 are switched on in alternation.

Figure 10:
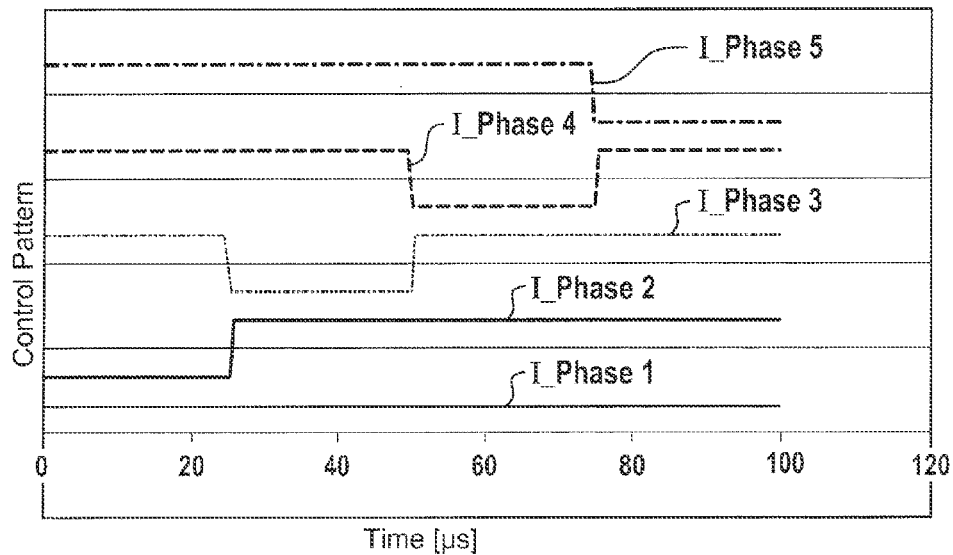
FIG. 10 shows diagrams for illustrating a control pattern for the first exemplary embodiment (4:1) shown in FIG. 7.

FIG. 10 shows diagrams for illustrating a control pattern for the first exemplary embodiment shown in FIG. 7. According to this exemplary embodiment, a simplified trapezoidal control pattern is used to achieve a current curve as shown in angular interval or time interval 1 in FIG. 7 for the case of a perfectly symmetrical machine having star point circuitry with a rotational speed=0, i.e., without influence by an induced voltage. A control frequency of 10 kHz has been assumed as an example. The control pattern has been denoted as a 4:1 control pattern, since one phase (in the example shown, phase 1) is continuously switched on, while the other four phases are controlled for identical time segments in each case, and their control is interchanged. In addition, "4:1" denotes the ratio of the phase current values, since, as is apparent from FIG. 7, the positive phase current corresponds to four times the value of the negative current.

In the case of an inversion of the above-mentioned control, i.e., in the case of continuous switching-on of the low side switches and a temporary, interchanging control of the high side switches, a current pattern as shown in FIG. 8 results.

Figure 11:
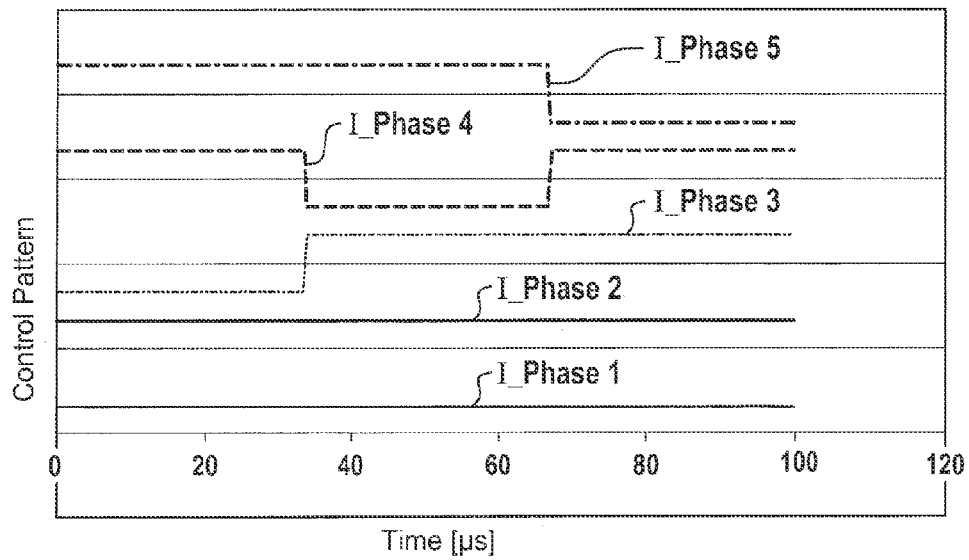
FIG. 11 shows diagrams for illustrating a control pattern for the exemplary embodiment (3:2) shown in FIG. 9.

FIG. 11 shows a diagram for illustrating a control pattern for the exemplary embodiment shown in FIG. 9. A simplified trapezoidal control pattern is used to achieve a current curve as shown in angular interval or time interval 1 in FIG. 9. In this exemplary embodiment, a higher control duration, with a minimum DC link current at the same time, is achieved. The control follows the next smaller integer multiple, i.e., "3." It is apparent from the 3:2 control pattern according to FIG. 11 that a block current is present which has a higher amplitude than in FIG. 9.

Figure 12:
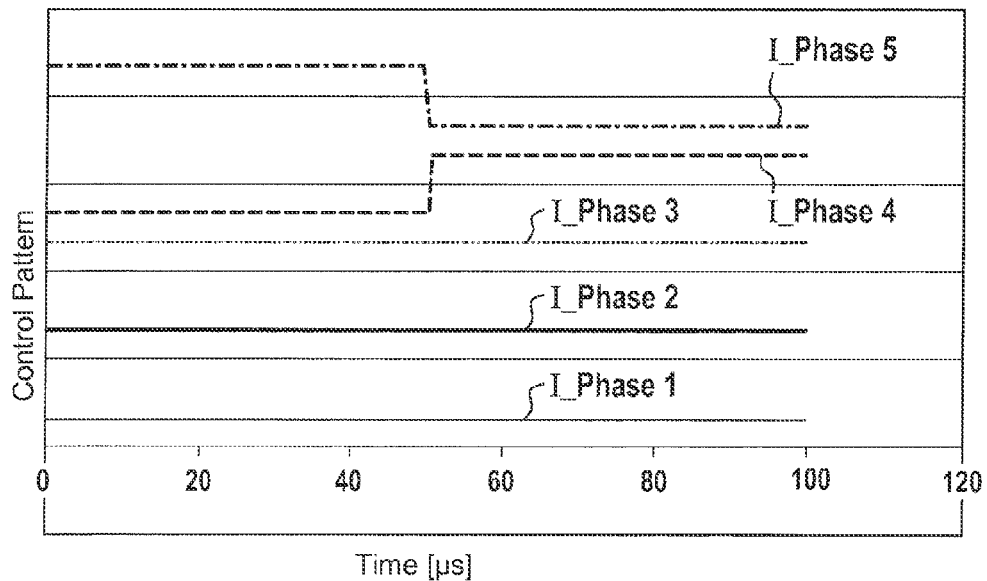
FIG. 12 shows diagrams for illustrating a control pattern for achieving a block current with 2:3 control according to a fourth exemplary embodiment of the present invention.

FIG. 12 shows diagrams for illustrating a control pattern for achieving a block current having 2:3 control according to a fourth exemplary embodiment of the present invention. In this type of control, different values of phase currents, which improve the torque utilization, are present in continuously switched-on phases 3, 4, and 5, depending on the circuitry used (triangle, star, pentagram, etc.).

Figure 13:
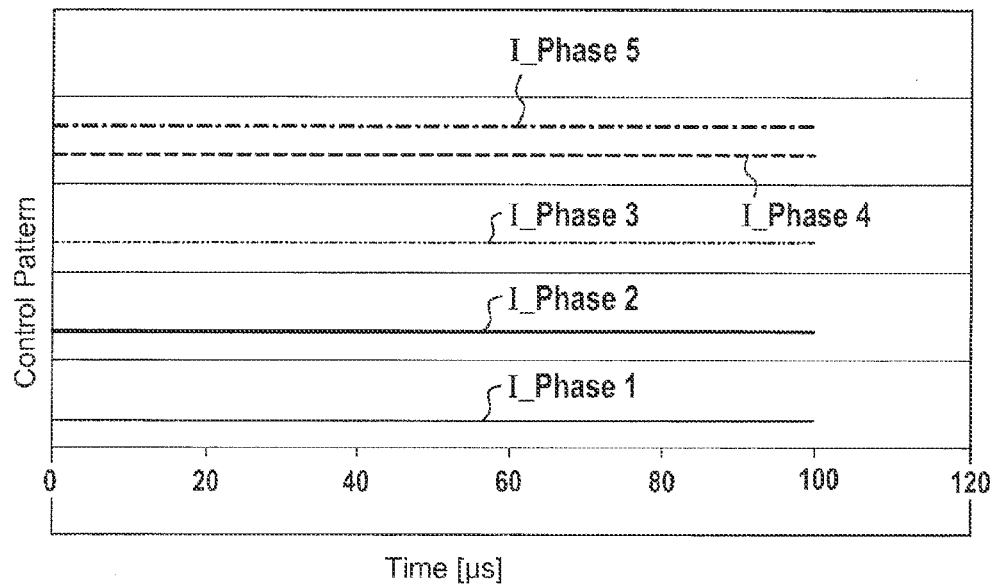
FIG. 13 shows diagrams for illustrating a control pattern for achieving a block current with 1:4 control according to a fifth exemplary embodiment of the present invention.

FIG. 13 shows diagrams for illustrating a control pattern of a block current having a 1:4 control according to a fifth exemplary embodiment of the present invention. This corresponds to a classical block commutation in which no switchover takes place within a control window.

It is thus possible to set further current levels in such a way that, even below the currents which result from a classical block commutation, extremely low DC link currents flow.

Figure 14:
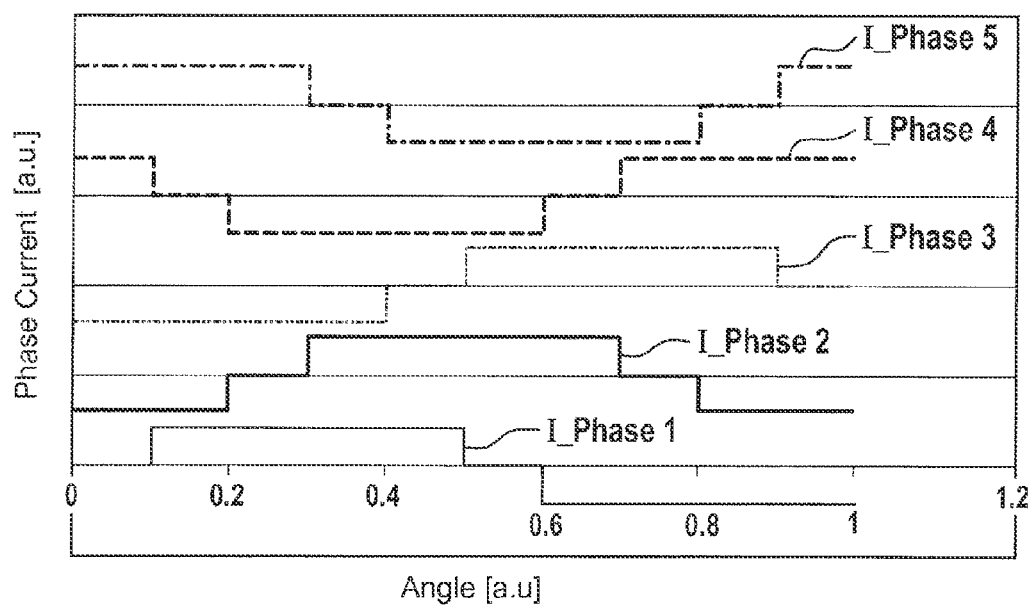
FIG. 14 shows diagrams for illustrating a sixth exemplary embodiment of the present invention.

FIG. 14 shows diagrams for illustrating a sixth exemplary embodiment of the present invention. In this exemplary embodiment, in contrast to the exemplary embodiments described above, use is also made of one or multiple phase current(s) which has/have the value 0. A 2:2 diagram results in FIG. 14, a 3:1, 2:1, 1:1 diagram also being possible.

Figure 15:
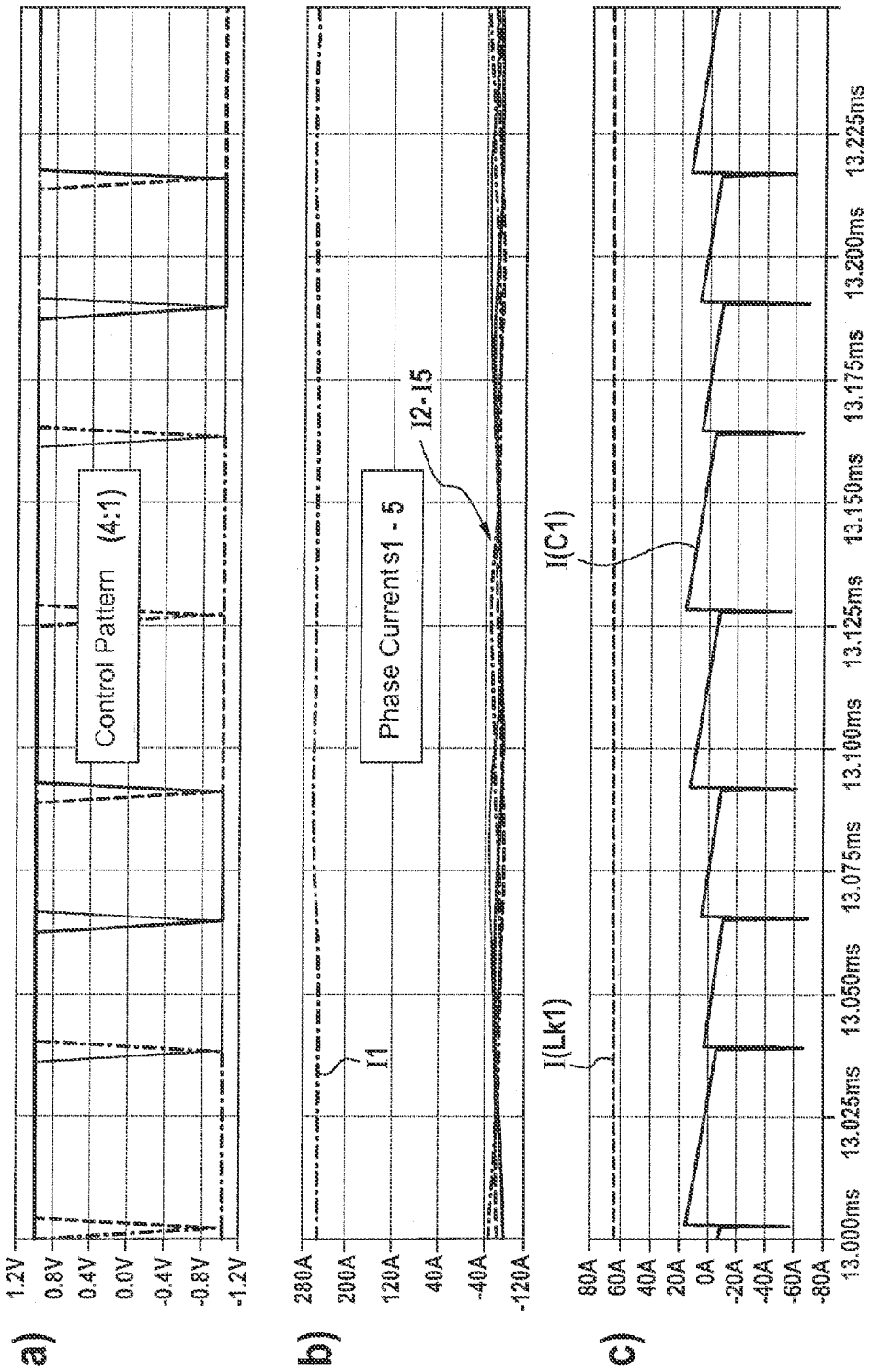
FIG. 15 shows diagrams for illustrating current curves when the control pattern shown in FIG. 10 is used.

FIG. 15 shows diagrams for illustrating current curves when the control pattern shown in FIG. 10 is used. FIG. 15a illustrates the 4:1 control pattern used, FIG. 15b illustrates phase currents 1 through 5, and FIG. 15c illustrates generator current I (Lk1) and DC link current I (C1). This is a simulation of the DC link current which, however, is adapted to the actual conditions. This means that the ohmic transfer resistance and line resistance as well as delay times in the transient switching operations of the power switches are taken into account. Therefore, the actual effective current of the DC link capacitor is not equal to 0, and is a function of the electrical parameters of the control and power electronics systems.

In addition, the DC link current is further increased by changes in the stator current which occur during the time segment changes as a function of the transient recovery time of the machine stator inductance. This type of time segment change is present, for example in the exemplary embodiment shown in FIG. 7, when a transition is made from the angular interval or time interval indicated by the rectangular box to the next angular interval or time interval.

In the example described above, it was possible to achieve an effective DC link current of approximately 30 A at an effective phase current of approximately 120 A.

In a conventional control process, for example a center-aligned control, the DC link current which results is present at the same electrical conditions as for approximately 85 A.

Consequently, in this example a reduction in the DC link current by approximately 65% is achieved.

Figure 16:
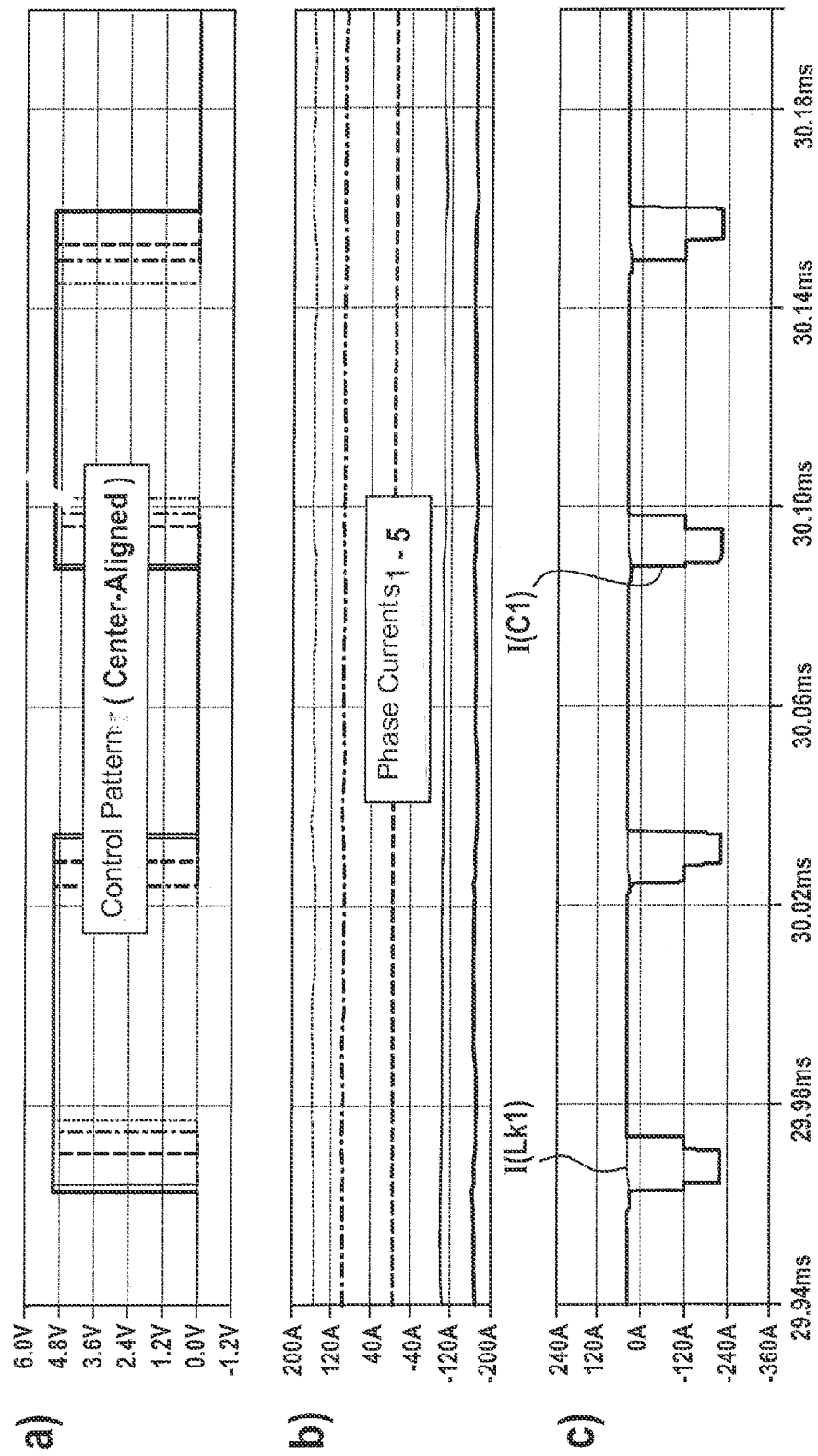
FIG. 16 shows diagrams for illustrating current curves for a known center-aligned control.

FIG. 16 shows diagrams for illustrating current curves for a known center-aligned control. FIG. 16a illustrates the control pattern used, FIG. 16b illustrates phase currents 1 through 5, and FIG. 16c illustrates generator current I (Lk1) and DC link current I (C1).

In contrast, FIG. 17 shows diagrams of current curves when a 3:2 control pattern according to FIG. 11 is used. It is apparent that in this exemplary embodiment, an effective DC link current of approximately 70 A has been achieved at an effective phase current of 260 A.

If these parameters are set for the conventional center-aligned control pattern, the resulting DC link current is approximately 230 A.

Consequently, in this example a reduction in the effective DC link current by approximately 70% may be achieved with the aid of a method according to the present invention.

It follows that a great reduction in the DC link current is achieved with the aid of a method according to the present invention. Simple control patterns are used which are characterized in that the control blocks are of equal or approximately equal size, the individual control blocks result as approximately integer multiples of 1, and the pattern of the controls is changed only when an electrical angle of 360°/phase number or of 360°/(2·phase number) is present. Further advantages of the present invention result from the possibility of stepwise setting of different current levels, and applicability in machines having any arbitrary number of current phases, preferably in machines in which the phase number is greater than 3.

What is claimed is:

1. A method for controlling a multiphase machine connected to a direct current voltage source, the multiphase machine having a DC link provided with a DC link capacitor, phase windings, and a high side switch and a low side switch for each phase, the switches associated with the individual phases being acted on by control signals from a control unit, the method comprising:

in order to reduce a DC link current, causing the control unit to provide block-shaped control signals for the switches associated with the individual phases in such a way that one of trapezoidal phase currents and pulsed phase currents are predefined;

connecting at least one phase current at any point in time in each control cycle; and selecting a value of an amplitude ratio of the predefined phase currents in such a way that the phase currents connected at that moment correspond to an instantaneous current of the direct current voltage source.

2. The method as recited in claim 1, wherein the machine is an n-phase machine, and the following relationship applies for the amplitude ratio of the predefined phase currents:

$$A=(n-x)/(n-y),$$

Where
$x+y=n$,
$n=3,4,5,6,7,\ldots$,
$0<x<n$,
$0<y<n$.

3. The method as recited in claim 1, wherein the machine is a five-phase machine, and the amplitude ratio of the predefined phase currents is one of 4:1, 3:2, 2:3, and 1:4.

4. The method as recited in claim 1, wherein the control unit controls the switches associated with the individual phases according to a flat top process, so that at least one phase within a PWM window is not clocked.

5. The method as recited in claim 1, wherein the control unit generates the control signals in such a way that within a control cycle, each time one phase current having a predefined current value is disconnected, another phase current having the same current value is connected.

6. The method as recited in claim 1, wherein the control unit generates the control signals in such a way that current values of all connected phase currents are always different from zero.

7. The method as recited in claim 1, wherein the control unit generates the control signals in such a way that a current value of at least one connected phase current is intermittently zero, whereby each time one phase current having a value not equal to 0 is disconnected, another phase current having the same current value is connected.

8. The method as recited in claim 7, wherein for a five-phase machine the phase currents, whose current values are not equal to zero, have an amplitude ratio of one of 3:1, 2:1, 2:2, 1:2, 1:3, and 1:1.

9. The method as recited in claim 1, wherein at any point in time in each control cycle, a predefined phase current has a positive current value, the other connected predefined phase currents each have the same negative current value, and a sum of the negative current values of the connected phase currents is equal to the positive current value.

10. The method as recited in claim 1, wherein at any point in time in each control cycle, a predefined phase current has a negative current value, the other connected predefined phase currents each have the same positive current value, and a sum of the positive current values of the connected phase currents is equal to the negative current value.

11. The method as recited in claim 1, wherein at any point in time in each control cycle, multiple predefined phase currents have the same positive current value, the other connected predefined phase currents each have the same negative current value, and a sum of the negative current values of the connected phase currents is equal to the sum of the positive current values of the connected phase currents.

* * * * *